United States Patent [19]
Tanno et al.

[11] Patent Number: 6,078,572
[45] Date of Patent: Jun. 20, 2000

[54] ACCESS METHOD, MOBILE STATION AND BASE STATION FOR CDMA MOBILE COMMUNICATION SYSTEM

[75] Inventors: Motohiro Tanno; Shinji Uebayashi, both of Kanagawa, Japan

[73] Assignee: NTT DoCoMo, Japan

[21] Appl. No.: 08/718,644

[22] Filed: Sep. 17, 1996

[30] Foreign Application Priority Data

Sep. 20, 1995 [JP] Japan .................................. 7-242091
Dec. 14, 1995 [JP] Japan .................................. 7-325687

[51] Int. Cl.[7] .................................................. H04B 7/216
[52] U.S. Cl. ............................................................ 370/335
[58] Field of Search ................................... 370/336, 337, 370/328, 347, 348, 329, 341, 468, 335, 441, 431, 344, 345, 442; 455/434, 515, 517

[56] References Cited

U.S. PATENT DOCUMENTS

| | | | |
|---|---|---|---|
| 5,384,777 | 1/1995 | Ahmadi et al. | 370/337 |
| 5,420,851 | 5/1995 | Seshadri et al. | 370/280 |
| 5,521,925 | 5/1996 | Merakos et al. | 379/63 |
| 5,625,629 | 4/1997 | Wenk | 379/63 |
| 5,633,875 | 5/1997 | Hershey et al. | 370/346 |

FOREIGN PATENT DOCUMENTS

| | | |
|---|---|---|
| 49-043501 | 8/1972 | Japan . |
| 53-084604 | 7/1978 | Japan . |
| 58-220537 | 12/1983 | Japan . |
| 62-196933 | 8/1987 | Japan . |
| 3-083431 | 4/1991 | Japan . |
| 4-179332 | 6/1992 | Japan . |
| 5-236012 | 9/1993 | Japan . |
| 6-085816 | 3/1994 | Japan . |

*Primary Examiner*—Ajit Patel
*Attorney, Agent, or Firm*—Brinks Hofer Gilson & Lione

[57] ABSTRACT

In a CDMA mobile communication system, for realizing a multiple-access, a common reverse channel 10 is divided into an access channel 10A and a message channel 10B. When data (packet) to be transmitted occurs in any mobile station 1-4, mobile station having data to be transmitted transmits a transmission request signal including information, such as packet size or the like, by using the access channel 10A. In contrast, base station 30 transmits a transmission permission signal, which designates a transmission timing of data and a spreading code to be used as transmitting, on the basis of the state of utilization of message channel 10B and the state of occurrence of data. Mobile stations 1-4 transmits data in accordance with the spreading code and the transmission timing which are designated from base station 30.

51 Claims, 11 Drawing Sheets

| TRAFFIC INFORMATION (R) | TRANSMISSION PROBABILITY (P) |
|---|---|
| ~Th1 | P1 (=1) |
| Th1~Th2 | P2 |
| Th2~Th3 | P3 |
| Th3~Th4 | P4 |
| Th4~ | P5 |

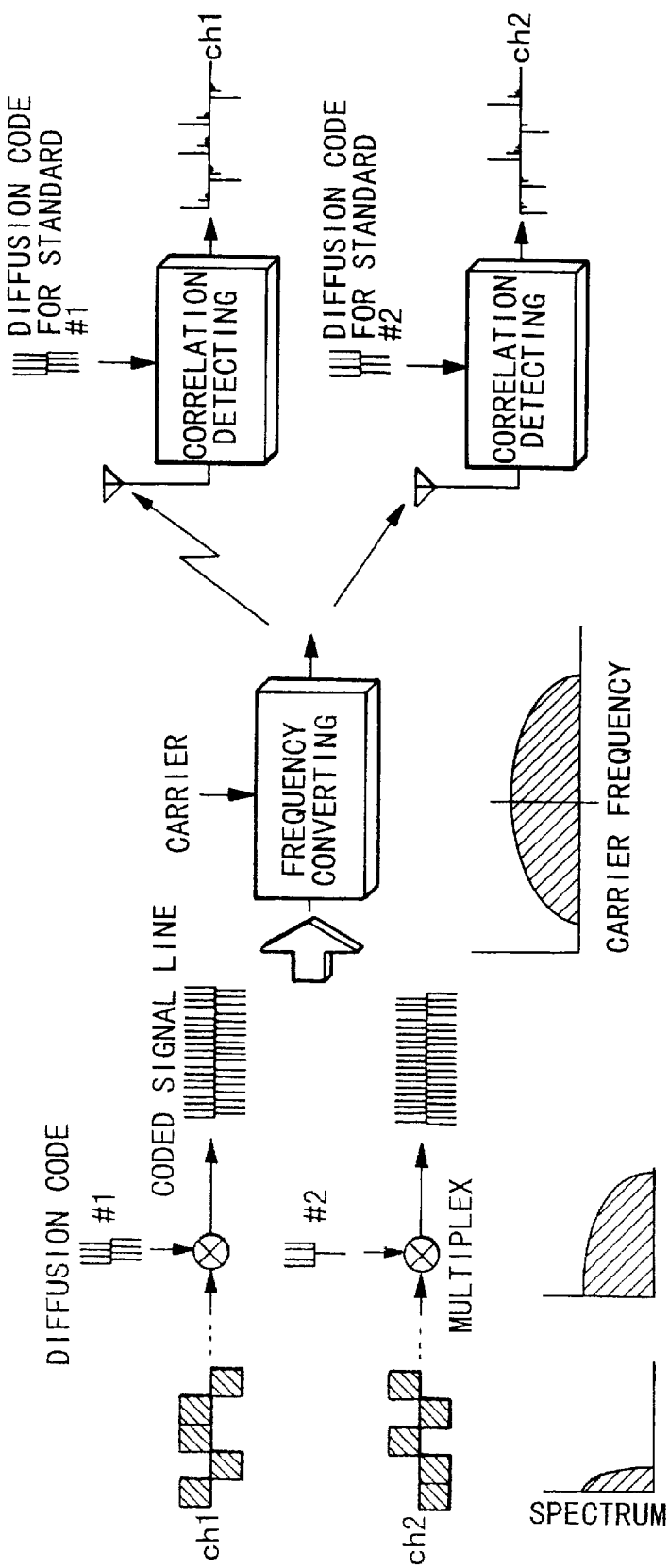

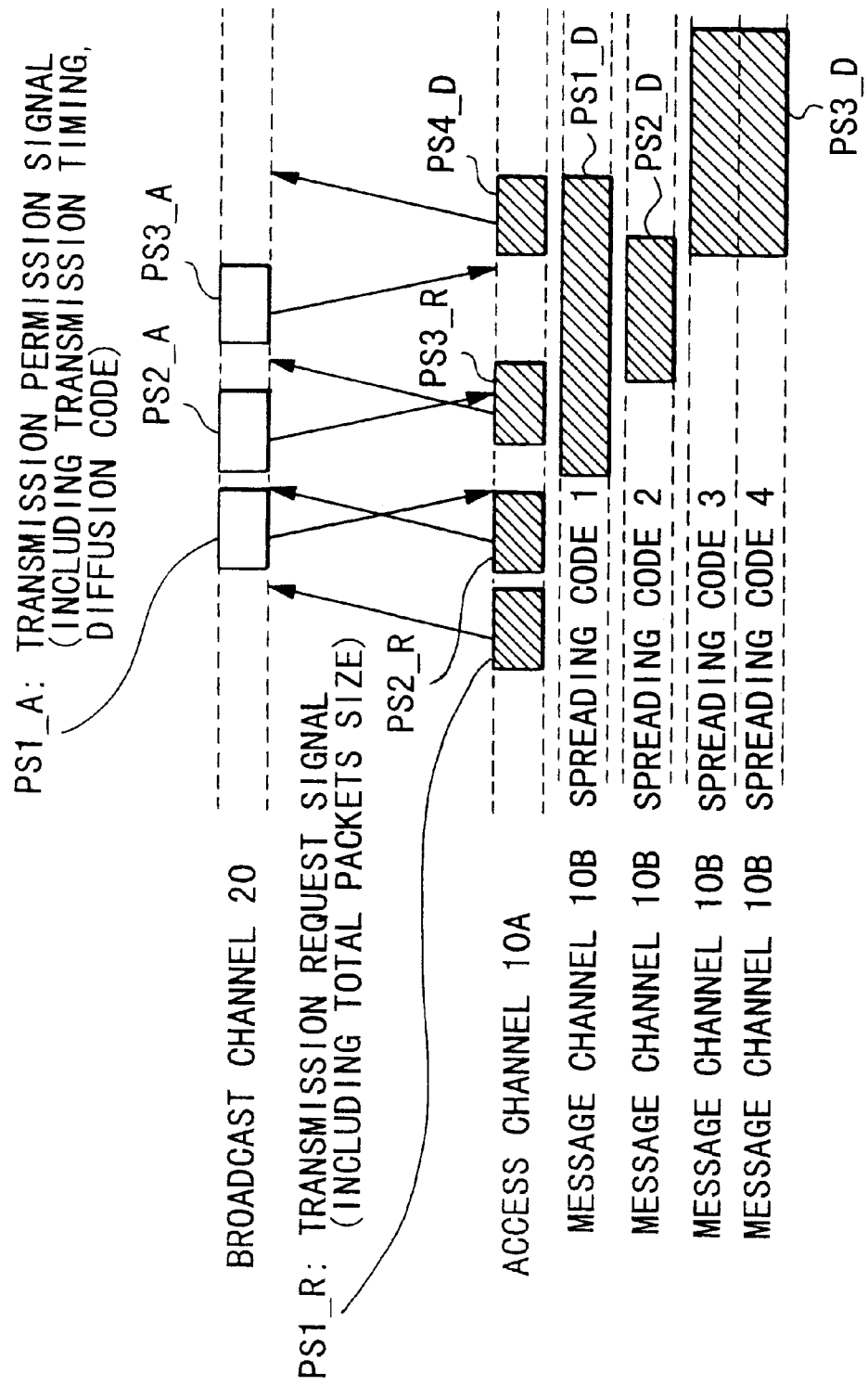

ACCESS METHOD, MOBILE STATION AND BASE STATION FOR CDMA MOBILE COMMUNICATION SYSTEM

BACKGROUND OF THE INVENTION

1. Field of the Invention

The present invention relates to an access method, a mobile station and a base station for a CDMA (Code Division Multiple Access) mobile communication system, in which a plurality of mobile stations access a base station at an optimal timing using a common channel.

2. Background

In conventional mobile communication systems, a packet communication is used in the transmission of control signals and the like. For example, in the digital type automobile telephone service standard (RCRSTD-27C) in Japan, it is prescribed that when a mobile station calls, the mobile station transmits a calling signal (calling packet signal) by using an access channel which can be used by all mobile stations in common. However, in a TDMA (Time Division Multiple Access) mobile communication system, in the case where a plurality of mobile stations transmit the calling signal at the same time, calling packets may 'collide' in the common channel, causing transmission efficiency to deteriorate.

The above mentioned example is a problem which occurs in the case of a TDMA mobile communication. In the case of a CDMA mobile communication system in which each channel is divided by codes, however, the base station can receive all calling packets even if a plurality of mobile stations transmit calling packets at the same time. When many channels are used at the same time, however, mutual interference between signals increases, so that the base station cannot receive all calling packets. This phenomenon will be referred to as a "collision" in the following description. Therefore, even in the case of CDMA mobile communication, when many mobile stations transmit calling packets at the same time, the transmission efficiency deteriorates due to the collision, in the same way as occurs in TDMA mobile communication systems (See CDMA digital mobile communication method (TIA IS-95) in the US for example).

As described above, packet collisions may occur even in the case of CDMA mobile communications, so that when the number of channels being used in the common channel reaches a prescribed number, new packet transmissions must waited until the number of the channels in use decreases, i.e., until the transmission of packets from other mobile stations is completed. However, it is not possible for the mobile stations which are waiting to transmit to know when the transmission of packets from other mobile stations is finished, so that the waiting mobile station must either retry transmitting the calling packets at fixed intervals, or must constantly observe the condition of the channel. In the case of retrying transmission at fixed intervals, however, transmission efficiency deteriorates due to the collision of packets. Furthermore, in the case where the mobile station observes the condition of the channel, it is necessary that the mobile station receives a transmitted signal from the other mobile stations. However, constant observation is not possible since other mobile stations may frequently go outside the vista. In addition, a considerable load is imposed on the mobile station, even if the mobile station can constantly observe the condition of the channel.

SUMMARY OF THE INVENTION

It is accordingly a primary object of the present invention to provide a multiple-access method, a mobile station and a base station for a CDMA mobile communication system, that are able to decrease the probability of packet collisions, and are capable of communicating with efficiency and low delay.

In an aspect of the present invention, there is provided a multiple-access method for a CDMA mobile communication system which consists of a common channel used in common when a plurality of mobile stations transmit data at an optional timing to a base station and a broadcast channel which is used when the base station transmits data to a plurality of mobile stations, the method characterized in that:

the common channel is divided into an access channel and a message channel in advance; and the mobile station reports to the base station via the access channel the occurrence of data to be transmitted, the base station reports the transmission timing of the data to be transmitted to the mobile station via the broadcast channel, and the mobile station transmits data to be transmitted at the transmission timing that was reported by the base station using the message channel.

Furthermore, in an aspect of the present invention, there is provided a mobile station for a CDMA mobile communication system which consists of:

a transmission and receiving means for transmitting and receiving a signal between a base station through a common channel and a broadcast channel;

a processing means for using the common channel by dividing it into an access channel and a message channel, the processing means modulating the data to be transmitted, and supplying the modulated data to the transmission and receiving means, and demodulating the received signal of the transmission and receiving means;

a control means for reporting to the base station via the access channel the occurrence of data to be transmitted, and for controlling the transmission and receiving means and the processing means to modulate data to be transmitted at the transmission timing reported from the base station by using the message channel, and supplying the modulated data to the transmission and receiving means.

Furthermore, in an aspect of the present invention, there is provided a base station for a CDMA mobile communication system which consists of:

a transmission and receiving means for transmitting and receiving a signal between a base station through a common channel and a broadcast channel;

a processing means which uses the common channel by dividing it into an access channel and a message channel, the processing means modulating data to be transmitted, supplying the modulated data to the transmission and receiving means, and demodulating the received signal of the transmission and receiving means;

a control means for deciding the transmission timing of data to be transmitted based on the result of observation of the received signal of the transmission and receiving means, when a mobile station reports the occurrence of data to be transmitted, reporting the transmission timing to the mobile station via the broadcast channel, controlling the transmission and receiving means and the processing means to receive data transmitted at the transmission timing, and demodulating the received data.

Therefore, in a CDMA mobile communication system, it is possible to decrease the packet size transmitted through the access channel which is set by dividing the common channel, so that it is possible to constrain the probability of collision of packets on the access channel. Furthermore, the transmission timing of data to be transmitted for each mobile station is reported, so that the collision of packets does not occur on the message channel which is set by dividing the common channel. Therefore, it is possible to realize a more efficient packet communication than in the conventional case.

In addition, the occurrence of data to be transmitted is reported to the base station through the access channel, so that when a mobile station transmits data using the message channel, the base station can always know the state of occurrence of data to be transmitted. Therefore, it is possible to control traffic effectively using the base station, to realize an efficient packet communication.

In addition, in a reservation packet communication system (SRMA: Split Channel Reservation Multiple Access) using TDMA, PRMA (Packet Reservation Multiple Access) or the like, when either the traffic on the access channel or the traffic on the message channel goes over the capacity limit, the capacity of the whole system is depressed. Accordingly, these reservation-type systems are problematic in that in order to obtain sufficient effect from them, it becomes essential to control the settings of the access channel and the message channel in accordance with traffic. In contrast, in a CDMA mobile communication system applying this invention, there is no problem if the total traffic on the access channel and on the message channel is less than the capacity limit, because CDMA is applied. As a result, it is possible to obtain the same effect as is obtained using a reservation type system, without carrying out the above-mentioned special control.

In addition, in a system applying TDMA, strict control of frame synchronizing is essential. In contrast, in a system applying CDMA in this invention, control does not need to be as strict as in the case of TDMA. Therefore, according to this invention, it is possible to realize a communication system which has a large capacity and flexibility, without any special control.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawings:

FIG. 3 is a conceptual drawing for describing the CDMA mobile communication method;

FIG. 4 is a timing chart showing the operation of a CDMA mobile communication system applying the multiple-access method of the first embodiment of the present invention;

DESCRIPTION OF THE PREFERRED EMBODIMENTS

An explanation will now be made of a CDMA mobile communication method with reference to FIG. 3.

In each channel ch1,ch2, a modulated signal, which has undergone a phase modulation or the like is again modulated at the transmission side by a spreading code assigned to each channel independently. The modulated signal is then transmitted after frequency conversion. On the other hand, the receiving side extracts information transmitted through a desired channel by detecting the correlation between the received signal and the spreading code assigned to the desired channel using a standard spreading code corresponding to the spreading code assigned each channel.

As the spreading code, for example, a code which has a high orthogonalization between codes, and which is obtained by using a PN (Pseudo Noise) code in combination with the Walsh function is used. Therefore, it is possible to exactly extract transmitted information at the receiving side even if communication using each channel ch1, ch2 is carried out at the same time. Thus, the channels ch1, ch2 can occupy all bands given for communication at all times during communication respectively.

An explanation will now be made of each embodiment of the present invention with reference to the drawings. However, basic portions of the physical structure are used in common in each embodiment, so that an explanation will first be made of the structure of a CDMA mobile communication system applying a multiple-access method of each embodiment, with reference made to FIG. 1. In the following explanation, "channel" indicates a communication route divided by code, frequency or time, and not only a communication route divided by frequency.

Figure 1:
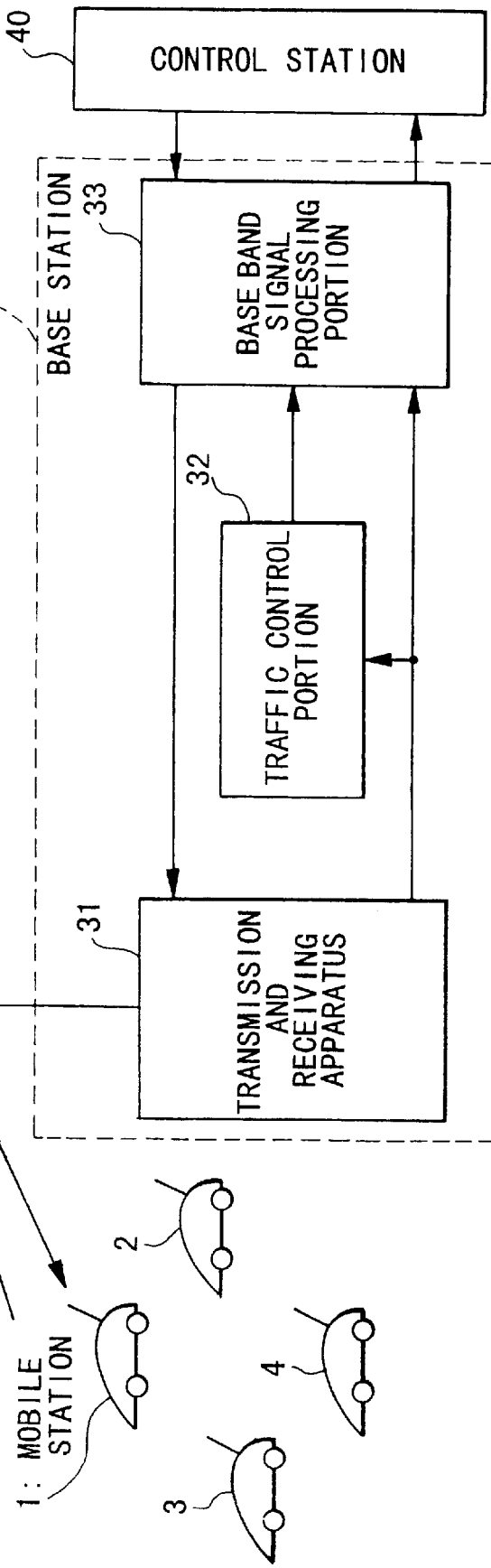
FIG. 1 is a block diagram showing a structural example of a CDMA mobile communication system applying a multiple-access method by each embodiment of the present invention.

FIG. 1 is a block diagram showing a structural example of a CDMA mobile communication system applying the multiple-access method of each embodiment of the present invention. In FIG. 1, number 30 is a base station which covers a sector (cell) of a fixed area; and numbers 1-4 are mobile stations which exist in the sector covered by the base station 30, each mobile station 1-4 accessing the base'station 30 at an optional timing. Although four mobile stations are shown in FIG. 1, the number of mobile station is optional.

Each number 10 and 20 is a common channel shared by each mobile station 1-4 respectively. Common channel 10 is a reverse channel from the mobile station side to base station 30 side, while the common channel 20 is a broadcast channel from the base station 30 side to the mobile stations 1-4 side. Reverse channel 10 is divided into an access channel 10A and a message channel 10B by each mobile station 1-4 and base station 30. Different functions are given to each channel 10A, 10B respectively. The functions of each channel 10A, 10B will be described below in connection with each embodiment.

In base station 30, number 31 is a transmission and receiving apparatus which transmits and receives signals through an antenna. Transmission and receiving apparatus 31 converts the frequency of the transmission base band signal by a fixed carrier, and transmits the transmission base band signal through broadcast channel 20. Furthermore, transmission and receiving apparatus 31 converts the frequency of the receiving signal which is received through reverse channel 10 on the basis of the carrier, and outputs the receiving base band signal. Number 32 is a traffic control portion which controls the traffic on reverse channel 10, traffic control portion 32 consisting of storage means, memory and so on. Traffic control portion 32 checks the state of utilization and occurrence of packets on message channel 10B on the basis of the receiving base band signal from transmission and receiving apparatus 31, and outputs information based on the above-mentioned conditions. An explanation will now follow of the outputted information from traffic control portion 32 in connection with each embodiment.

A base band signal processing portion 33 extracts information transmitted from the mobile station by detecting the correlation between the receiving base band signal outputted from transmission and receiving apparatus 31, and outputs the extracted information to control station 40 through a subsequent part, such as a multiplexing apparatus or the like (figure is omitted). Furthermore, base band signal processing portion 33 generates a transmission base band signal by multiplying information supplied through the multiplexing apparatus by a spreading code, and outputs the transmission base band signal to transmission and receiving apparatus 31. Base band signal processing portion 33 positions information supplied from traffic control portion 32 to the fixed bit position of transmission base band signal, and outputs the information to transmission and receiving apparatus 31.

Figures 2, 11:
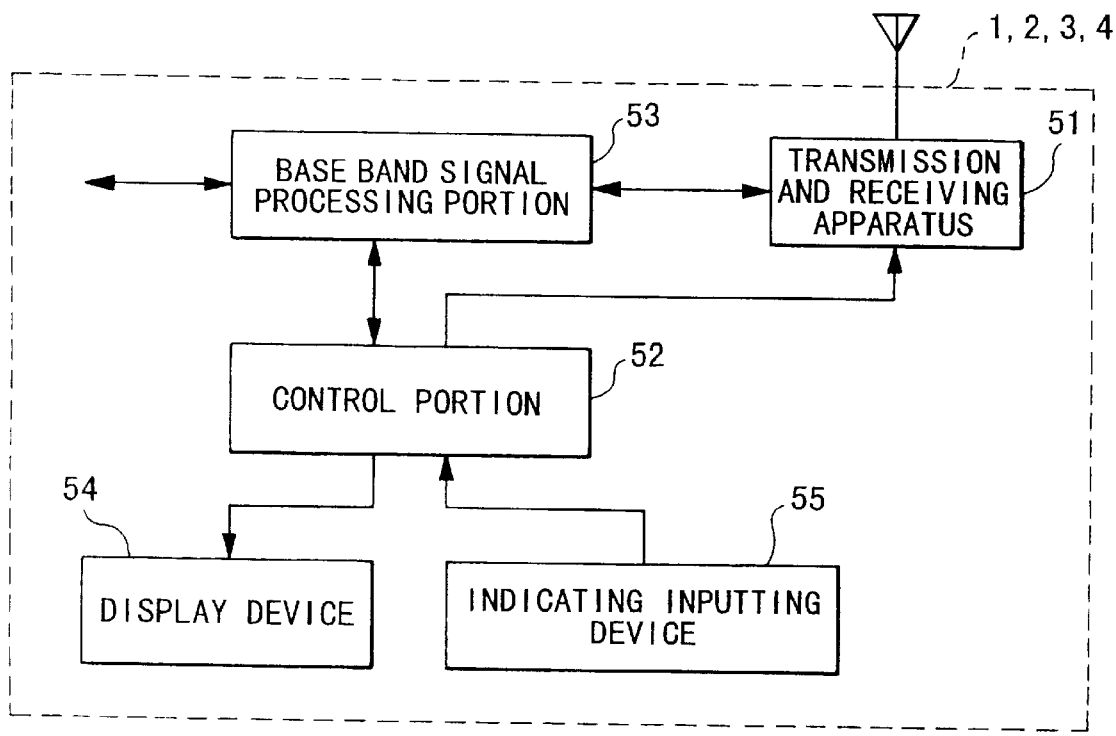
FIG. 2 is a block diagram showing a structural example of a mobile station in FIG. 1.
FIG. 11 is a conceptual diagram showing an example of a conversion table for obtaining a transmission probability P from traffic information R, having the transmission probability calculation device 35 in FIG. 10.

Next, an explanation will be made of the structure of mobile stations 1-4 with reference to FIG. 2. In FIG. 2, number 51 is a transmission and receiving apparatus which transmits and receives a signal through an antenna. Transmission and receiving apparatus 51 converts the frequency of the transmission base band signal by a fixed carrier, and transmits the transmission base band signal through the antenna and reverse channel 10. Furthermore, transmission and receiving apparatus 51 converts the frequency of a receiving signal, which is received through broadcast channel 20 on the basis of the carrier, and outputs it as the receiving base band signal.

Base band signal processing portion 53 extracts information transmitted from base station 30 by detecting the correlation between the receiving base band signal outputted from transmission and receiving apparatus 51 and the spreading code, and outputs the extracted information to a subsequent part, such as a voice code/decode device or the like (figure is omitted). Furthermore, base band signal processing portion 53 generates the transmission base band signal by multiplying information supplied from the voice code/decode device, etc. by the spreading code, and outputs the transmission base band signal to transmission and receiving apparatus 51. Number 54 is the display apparatus of a liquid crystal display or the like, and number 55 is an indicating input device provided with a keypad or the like.

Control portion 52 controls each above-mentioned constituent element, and in particular, controls transmission and receiving apparatus 51, base band signal processing portion 53 and display apparatus 54 on the basis of the information inputted from indicating input device 55, the preset program and the information extracted by base band signal processing portion 53.

However, base station 30 and each mobile station 1-4 consists of CPU (Central Processing Unit), RAM (Random Access Memory), ROM (Read Only Memory), DSP (Digital Signal Processor), and various interfaces and the like, the above-mentioned constituent element being realized so as to operate in cooperation with these portions.

A. First Embodiment

An explanation will now be made of the first embodiment of the present invention with reference to FIG. 4. In FIG. 4, each region which is divided with a dotted line indicates a channel respectively.

For realizing the operation shown in FIG. 4, a CDMA mobile communication system applying the multiple-access method of this embodiment, consists of a plurality of message channels 10B, and has the functions described below, in addition to the above-mentioned elements.

Control portion 52 of each mobile station decides whether the size (total packet size to be used) of the information to be transmitted is equal to or less than a fixed size or not, before transmission of the information. When the size of the information is equal to or less than the fixed size, control portion 52 controls each part so that the information is transmitted using access channel 10A only. The fixed size may be set to an optional value. Although it is possible for base station 30 to dynamically set the fixed size in accordance with the state of utilization of access channel 10A and all message channels 10B, in this embodiment, the fixed size is a fixed value, for example, the packet size which is prescribed in advance.

On the other hand, when the information size is not equal to or less than the fixed size, control portion 52 supplies information, such as the size of the information to be transmitted, in order to reserve transmission of the information. Control portion 52 then causes base band signal processing portion 53 and transmission and receiving apparatus 51 to generate a transmission request signal that includes the information, and then output the transmission request signal to base station 30 via access channel 10A.

Traffic control portion 32 of base station 30 stores information showing the state of traffic occurrence employing any message channel 10B (i.e., all schedules for receiving data transmitted through each message channel 10B), and checks the state of utilization (i.e., rate or quantity used) of all message channels 10B from the receiving base band signal that is supplied through each message channel 10B and the transmission and receiving apparatus 31. Furthermore, when traffic control portion 32 of base station 30 receives the receiving base band signal which includes a signal transmitted in accordance with the transmission request signal, traffic control portion 32 decides on a transmission timing to avoid the collision of packets and a spreading code on the basis of the state of traffic occurrence and usage. Traffic control 32 supplies information expressing the transmission timing and the spreading code to base band signal processing portion 33, and causes base band signal processing portion 33 to supply the information to transmission and receiving apparatus 31 after locating the fixed bit position of the transmission base band signal.

As a result, the transmission timing and the spreading code which are decided by traffic control portion 32 are transmitted through broadcast channel 20 as a transmission permission signal for the mobile station which transmits the transmission request signal from transmission and receiving apparatus 31. However, traffic control portion 32 stores the total packet size, the timing offset of the transmission, and the time of the offset setting, in a way such that the relationship of correspondence with the transmission request signal 1 PS1_R may be understood.

In addition, control portion 52 of each mobile station converts the frequency of the transmission permission signal transmitted to it via broadcast channel 20, and then extracts the transmission timing and the spreading code from the base band signal which is obtained by converting the frequency. Furthermore, control portion 52 controls base band signal processing portion 53 to transmit data to the transmission permission signal (that is, data corresponding to the transmission request signal) by using the spreading code at the transmission timing.

Next, the operation of the mobile communication system will be explained with reference to FIG. 4. In FIG. 4, mobile station 1 first transmits transmission request signal PS1_R to base station 30 via access channel 10A. Transmission request signal PS1_R includes information showing the total packet size of the information (data PS1_D) to be transmitted by mobile station 1. When base station 30 receives transmission request signal PS1_R from mobile station 1, traffic control portion 32 reads out the state of occurrence of traffic using any message channel 10B, and then checks the utilization condition of all message channels 10B.

In the example shown in FIG. 4, at the point where transmission request signal PS1_R is extracted, because none of the message channels 10B are used and there is no schedule to receive data via any message channel 10B, base station 30 immediately permits transmission of data PS1_D. More concretely, traffic control portion 32 sets the offset of the transmission timing to zero, and selects an appropriate spreading code (spreading code 1 in FIG. 4), and outputs the appropriate spreading code to base band signal processing portion 33. As a result, base station 30 transmits transmission permission signal PS1_A which includes information showing the transmission timing and the spreading code which are to be used when data PS1_D is transmitted, to mobile station 1 through broadcast channel 20. At this time, traffic control portion 32 stores the total packet size, the offset of the transmission timing and the time of the offset setting in such a way that the relationship of correspondence with the transmission request signal PS1_R is clear.

When mobile station 1 receives transmission permission signal PS1_A, control portion 52 of mobile station 1 sets the indicated spreading code 1 into base band signal processing portion 53, and waits for the time shown by the indicated offset. In this case, the offset is zero, so that control portion 52 instructs base band signal processing portion 53 to immediately multiply the information to be transmitted and the spreading code 1. As a result, data PS1_D is transmitted from mobile station 1 using message channel 10B, and then is received by base station 30.

Next, when mobile station 2 transmits transmission request signal PS2_R to base station 30 via access channel 10A, and base station 30 receives that transmission request signal PS2_R, traffic control portion 32 reads out the state of traffic occurrence using any message channel 10B, and checks the utilization condition of all message channels 10B. At the point where transmission request signal PS2_R is extracted, only the receipt of data PS1_D is scheduled, and the traffic on all message channels 10B is less. Therefore, the offset of the transmission timing becomes zero. However, the spreading code 2, which is not used at present and is not scheduled for use, is selected as a spreading code which is used at transmission time of data PS2_D. The subsequent operation carried out is identical to that performed at the time of transmission of data PS2_D. Data PS2_D, which was modulated using spreading code 2 is transmitted from mobile station 2 through message channel 10B, and is received by base station 30.

Next, at the point when mobile station 3 transmits transmission request signal PS3_R to base station 30 through access channel 10A, and base station 30 receives the above transmission request signal PS3_R, traffic control portion 32 reads out the occurrence state of traffic using any message channel 10B, and checks the state of utilization of all message channels 10B. At that point, transmission request signal PS3_R is extracted and the transmission of data PS1_D and PS2_D is initiated, with traffic on all message channels 10B increasing. While the increase in traffic is not so great that collisions occur, it does give rise to interference. Therefore, the offset of the transmission timing is set to a time duration by which it is expected that the traffic on message channel 10B will have decreased.

In this case, transmission of data PS1_D, PS2_D for transmission request signal PS1_R, PS2_R is already initiated, so that it is clear that a transmission using any message channel 10B is not scheduled after this. Furthermore, the communication speed between the mobile station and the base station is the same, so that it is possible to assume the finishing time of the transmission of each data PS1_D, PS2_D on the basis of the present time, the time and the transmission timing which corresponds to transmission request signal PS1_R, PS2_R, and the total packet size of each data PS1_D, PS2_D transmitted by transmission request signal PS1_, PS2_R. Therefore, base station 30 decides the offset of the transmission timing of data PS3_D on the basis of the finishing time of either data PS1_D or PS2_D and the present time.

However, although traffic control portion 32 may revise the offset after considering the data propagation delay time between base station 30 and mobile station 3, in a CDMA mobile communication system, control of the transmission timing does not need to be as strict as in the case of a TDMA system. Accordingly, in this embodiment, the operation is simplified to omit the revising operation.

Furthermore, in FIG. 4, spreading codes 2, 3 which are not used at present and are not scheduled for use, are selected as spreading codes which are used during transmission of data PS3_D. As is clear from this, then, the number of the channel used in a single data transmission is optional.

Afterward, the same operation is carried out as in the transmission of data PS1_D, data PS3_D, which was modulated by using the spreading codes 3,4, is transmitted from mobile station 3 through message channel 10B, and is received by base station 30.

When mobile station 4 transmits information, control portion 52 of mobile station 4 decides that the size of the information to be transmitted is less than the fixed size, and controls each portion to transmit data PS4_D using only access channel 10A. As a result, data PS4_D is transmitted through access channel 10A, and is received in the same way as data PS1_D–PS3_D at base station 30, to complete the communication.

As mentioned above, according to the first embodiment, only the short transmission request signal for reserving data transmission is transmitted in access channel 10A, so that the probability of a packet collision in access channel 10A is constrained to be extremely low. Furthermore, the data transmission in each message channel 10B is carried out at the transmission timing decided by base station 30, so that if the decision algorithm for the transmission timing is appropriate, the packet does not collide in any of message channels 10B. Therefore, transmission can be carried out efficiently.

Furthermore, because the system reserves the transmission of the data by the transmission timing and reports the transmission timing from base station 30 to mobile station, it is not necessary to retry transmission from base station 30 to the mobile station, making it possible to decrease the probability of a packet collision.

Furthermore, in base station 30, the system can communicate by using a vacant channel, by indicating the optimum spreading code to the mobile station, after deciding the optimum spreading code which is used in the data transmission. As a result, it is possible to avoid the problem in which the system is waiting for long periods of time in spite of transmitting the short information (data) because it cannot transmit data since the desired spreading code (channel) is used. That is, it is possible to avoid the problem of delaying the transmission delay for a long period of time, regardless of the package size.

In addition, in applying this embodiment to a CDMA mobile communication system, there is no necessity to obtain exactly the transmission timing compared to a TDMA system, so that it is possible to simplify the structure of the base station, and to reduce a load on the base station.

Furthermore, in the case where the total packet size of the information to be transmitted is small enough, the system is designed so as to transmit the information (data) by using access channel 10A so that it is possible to cut the over head without impairing the above-mentioned advantages.

B: Second Embodiment

Figure 5:
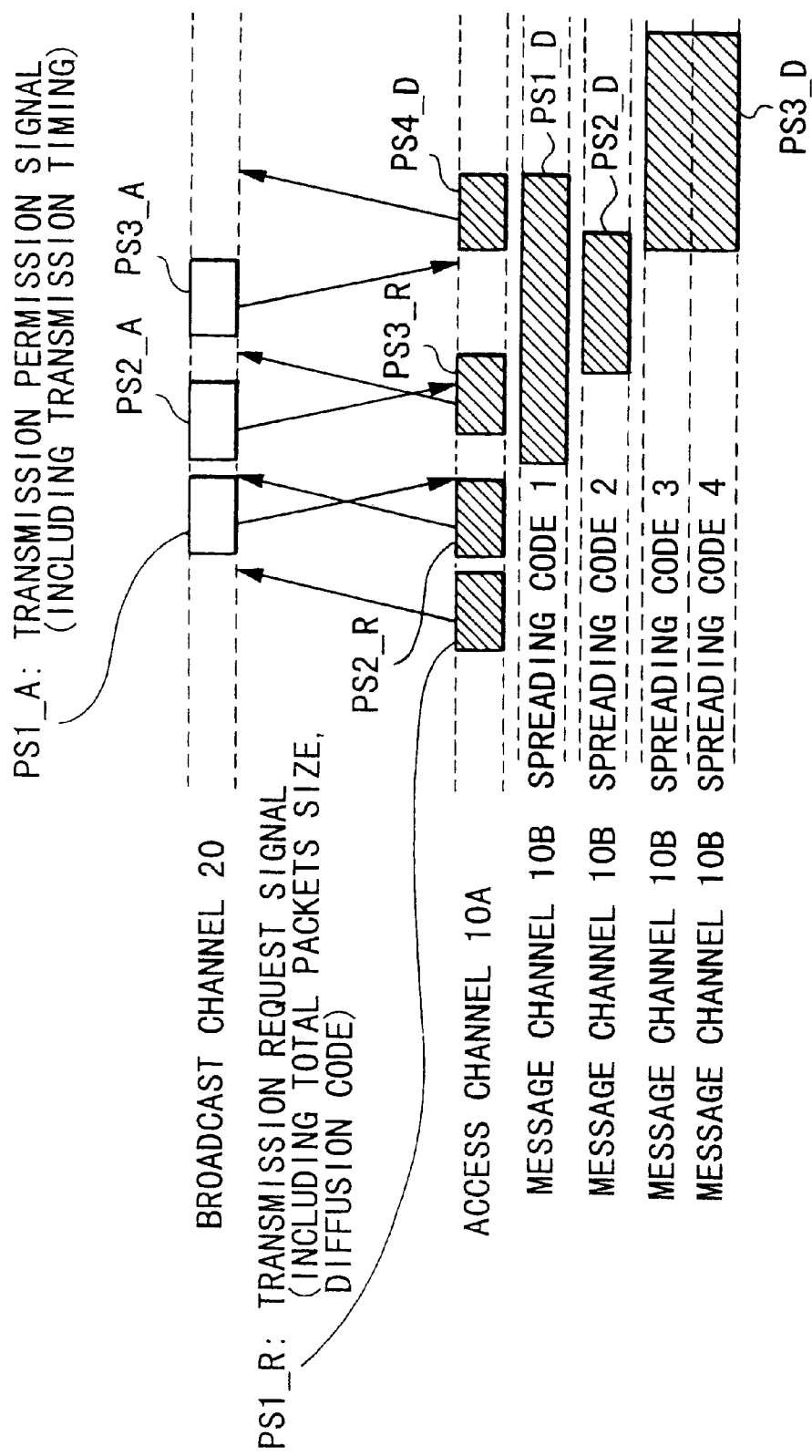
FIG. 5 is a timing chart showing the operation of a CDMA mobile communication system applying the multiple-access method of the second embodiment of the present invention.

Next, an explanation will now be made of the second embodiment of the present invention with reference to FIG. 5. As is clear from FIG. 5, in this second embodiment, the information showing the spreading code is included in the transmission request signal, but the transmission permission signal is not included. This is because the spreading code is assigned unchangeably to each mobile station in advance, and the message channel which is used by each mobile station is determined and fixed. An explanation will now be made of differences in function from the first embodiment, which occur due to aforementioned difference.

Control portion 52 of each mobile station in this second embodiment decides whether the size of the information to be transmitted is equal to or less than a fixed size or not, before transmitting the information. When the size of the information is equal to or less than the fixed size, control portion 52 supplies information including a total packet size of the information and the spreading code preassigned to itself as a fixed value to base band signal processing portion 53 in order to reserve the transmission of information. Control portion 52 then causes base band signal processing portion 53 and transmission and receiving apparatus 51 to generate the transmission request signal including the information, and causes the transmission request signal to be transmitted to base station 30 through access channel 10A.

Furthermore, traffic control portion 32 of base station 30 stores information expressing the state of occurrence of traffic using any message channel 10B with each channel (each spreading code), and checks the state of utilization of each message channel 10B with each channel on the basis of the receiving base band signal supplied through each message channel 10B and transmission and receiving apparatus 31. When traffic control portion 32 receives the receiving base band signal for the transmission request signal, it extracts the spreading code from the information which is included in the transmission request signal, and decides the transmission timing in order to avoid the collision of packets on the basis of the state of traffic occurrence and of utilization for the spreading code (channel) at that point. Traffic control portion 32 then supplies information showing the transmission timing to base band signal processing portion 33, and causes base band signal processing portion 33 to output the information after locating the information on the fixed bit position of the transmission base band signal. However, traffic control portion 32 stores a total packets size, the timing offset of the transmission and the time of the offset setting, in such a way that the relationship of correspondence with the spreading code is clear.

Next, an explanation will be made of the operation of the mobile communication system, with the focus on the difference in the operation from the first embodiment, with reference being made to FIG. 5.

First, mobile station 1 transmits transmission request signal PS1_R to base station 30 through access channel 10A. Transmission request signal PS1_R includes information expressing the total packet size of data PS1_D, which will be transmitted from mobile station 1, and the spreading code 1 assigned in mobile station 1 in advance as a fixed value.

When base station 30 receives transmission request signal PS1_R from mobile station 1, at that point, traffic control portion 32 reads out the state of occurrence of traffic using any message channel 10B, and checks the state of utilization of all message channels 10B. In the example of FIG. 5, at the point where transmission request signal PS1_R is extracted, the message channel shown by spreading code 1 is not in use, and there is no schedule to receive data through the channel. Further, there is no interference from a channel corresponding to other spreading codes, so that base station 30 immediately permits transmission of data PS1_D. More concretely, traffic control portion 32 sets the timing offset of the transmission to zero, and outputs the offset to base band signal processing portion 33. As a result, base station 30 transmits transmission permission signal PS1_A to mobile station 1 through broadcast channel 20. Transmission permission signal PS1_A includes information expressing the transmission timing to be used when data PS1_D is transmitted. However, at this time, traffic control portion 32 stores the total packet size, the timing offset of the transmission, and the time of the offset setting, in such a way that the relationship of correspondence with the spreading code is clear.

When mobile station 1 receives transmission permission signal PS1_A, control portion 52 of mobile station 1 instructs base band signal processing portion 53 to immediately multiply information to be transmitted and the spreading code 1. As a result, data PS1_D is transmitted from mobile station 1 through message channel 10B, and then is received by base station 30. Afterward, the operation for calling from mobile stations 2-4 is carried out in the same way as in the first embodiment.

As is clear from above explanation, according to this second embodiment, the only information reported from base station 30 to the mobile station is the transmission timing, so that it is possible to reduce the load on base station 30.

However, it is also permissible that the system assign a plurality of spreading codes to a mobile station, select one spreading code when the information is transmitted, and then transmit information expressing the selected spreading code by including to the transmission request signal. In this case, for example, the system sets the channel expressed with a specific spreading code as an urgent channel. The urgent channel is set as not use with communication without an emergency, that is, in general, if the spreading code of the urgent channel is set as not use to the utmost, the communication in an emergency is able to carry out smoothly.

[A Modification of Embodiment 2]

Figure 6:
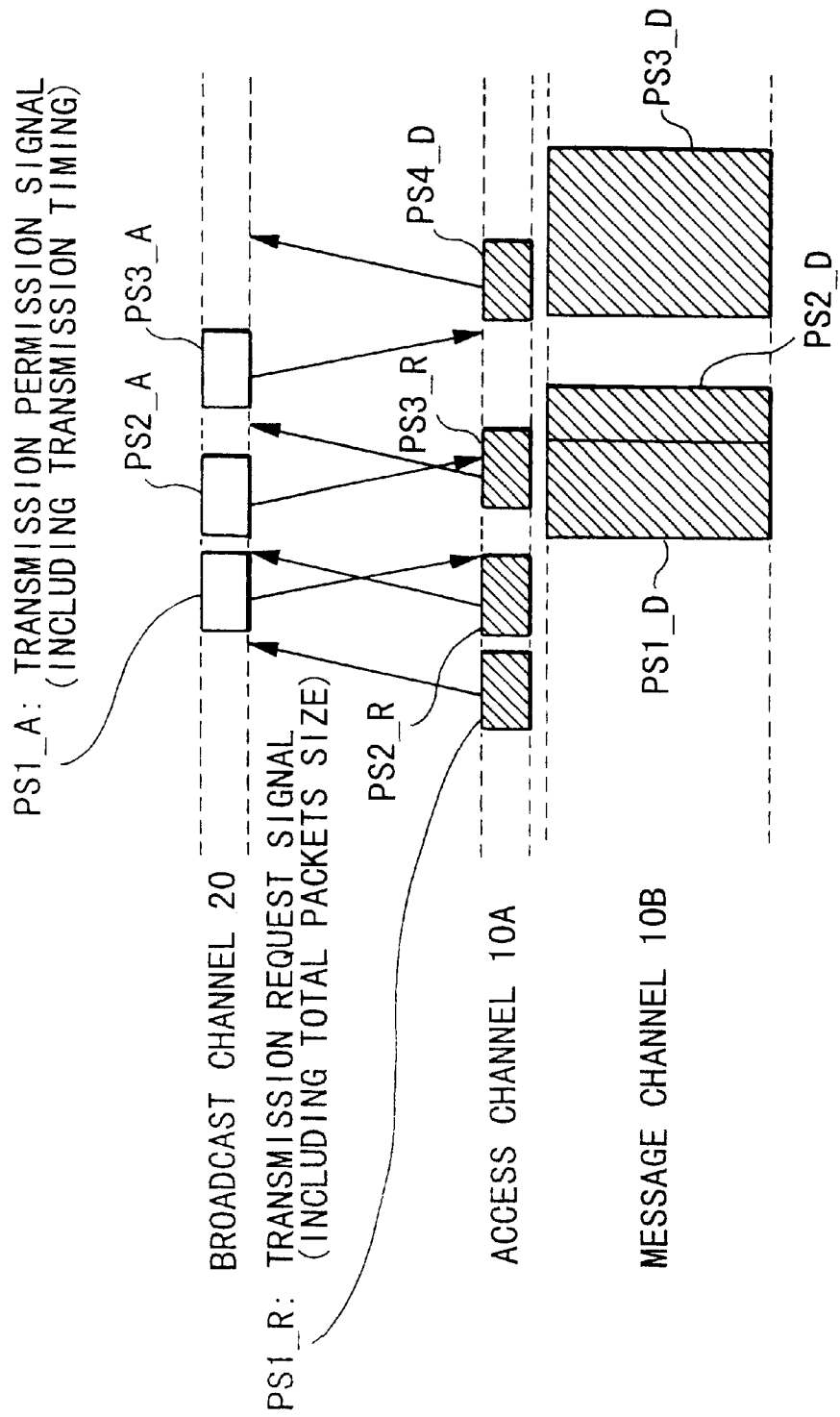
FIG. 6 is a timing chart showing the operation of a CDMA mobile communication system applying a modification example of the multiple-access method by the second embodiment of the present invention.

Next, an explanation will be made of a modification of the second embodiment with reference to FIG. 6. As is clear from FIG. 6, in this modification, there is only one message channel 10B, with each data being transmitted using this one message channel 10B. Therefore, in the second embodiment, the spreading code used for selecting the message channel is not used in the modification. An explanation will now be made of the difference in functions, which occurs due to the aforementioned difference between the second embodiment and the modification.

Control portion 52 of each mobile station decides whether the size of the information to be transmitted is equal to or less than the fixed size or not, before transmitting the information. When the size of the information is equal to or less than the fixed information, control portion 52 supplies information, such as the total packet size of the information, to base band signal processing portion 53 to reserve the transmission of the information, causes base band signal processing portion 53 and transmission and receiving apparatus 51 to generate the transmission request signal including the information, then causes the transmission request signal to be transmitted through access channel 10A.

Traffic control portion 32 of base station 30 stores information expressing the state of occurrence of traffic using message channel 10B, and checks the state of utilization of message channel 10B (for example, whether message channel 10B is used or not) from the receiving base band signal supplied through message channel 10B and transmission and receiving apparatus 31. Furthermore, when base station 30 receives the receiving base band signal which answers the transmission request signal, it determines the transmission timing to avoid packet collision on the basis of the state of traffic occurrence and utilization at the received timing, and supplies information showing the transmission timing to base band signal processing portion 33.

Furthermore, control portion 52 of each mobile station extracts the transmission timing from information obtained from the transmission permission signal which is transmitted through broadcast channel 20, and controls base band signal processing portion 53 to transmit data which answers the transmission permission signal at the transmission timing.

Next, an explanation will be made of the operation of the mobile communication system, with the focus on the difference from the second embodiment, with reference being made to FIG. 6.

First, mobile station 1 transmits the transmission request signal PS1_R to base station 30 through access channel 10A. Transmission request signal PS1_R includes information expressing the total packet size of the information (data PS1_D) to be transmitted by mobile station 1. When base station 30 receives transmission request signal PS1_R from mobile station 1, at that point, traffic control portion 32 reads out the state of occurrence of traffic using message channel 10B, and then checks the state of utilization of message channel 10B. In the example of FIG. 6, at the point where transmission request signal PS1_R is extracted, message channel 10B is not in use and there is no schedule to receive data through message channel 10B, so that base station 30 immediately permits the transmission of data PS1_D. At this time, traffic control portion 32 stores the total packet size, the offset of the transmission timing and the time of the offset setting.

When mobile station 1 receives transmission permission signal PS1_A, control portion 52 of mobile station 1 immediately instructs base band signal processing portion 53 to multiply information to be transmitted and the spreading code 1. As a result, data PS1_D is transmitted from mobile station 1 by using message channel 10B, and then is received by base station 30. Then, the same operation carried out for transmission request signal PS1_R is repeated for each transmission request signal PS2_R, PS3_R, sequentially. However, the offset timing of the transmission for transmission request signal PS2_R expresses the finishing time of transmission of data PS1_D. The explanation of the operation for transmitting request signal PS4_R is omitted because this operation is the same as the operation of the first and the second embodiments.

In this modification, it is possible to take a wide bandwidth for the channel which is used to transmit data, so that it is possible to increase the transmission speed of data, for example. If the transmission speed of data increases, the duration of time from the beginning to the end of the transmission becomes shorter. As a result, in the case where the total packet size of each data (information) is sufficiently small as compared to the occurrence interval of each data, then, as may be understood by comparing FIG. 6 and FIG. 5, it is possible to shorter the duration of time from the beginning of transmission of the transmission request signal to completion of the transmission of data.

C. Third Embodiment

Next, an explanation will be made of the third embodiment of the present invention with reference to FIG. 7. However, in the example shown in FIG. 7, mobile station 1 and mobile station 2 call at the same time, after which, base stations 3 and 4 call successively. As is clear from FIG. 7, in this third embodiment, there are a plurality of access channels 10A, with the system set so that each mobile station can call using any access channel. An explanation will now be made of the difference in function which occurs due to this aforementioned difference.

Control portion 52 of each mobile station decides whether the size of the information to be transmitted is equal to or less than the fixed size or not, before transmitting the information. When the size of the information to be transmitted is equal to or less than the fixed size, control portion 52 supplies information, such as total packet size of the information, to base band signal processing portion 53 to reserve the transmission of the information, and causes base band signal processing portion 53 and transmission and receiving apparatus 51 to generate the transmission request signal including the information. Furthermore, control portion 52 selects an access channel to use for transmitting the transmission request signal on the basis of the probability distribution reported from base station 30 in advance or the probability distribution set in advance, and then causes base band signal processing portion 53 and transmission and receiving apparatus 51 to transmit the transmission request signal to base station 30 through the selected access.

An explanation of examples of probability distributions follows below. In these examples, the total of the probabilities for the channels is one, p, q and r are each real numbers equal to or greater than zero, but less than or equal to 1, and p+q+r=1.
[first example]
probability using the first access channel: 1/3
probability using the second access channel: 1/3
probability using the third access channel: 1/3
[second example]
probability using the first access channel: 1/5
probability using the second access channel: 2/5
probability using the third access channel: 2/5
[third example]
probability using the first access channel: p
probability using the second access channel: q
probability using the third access channel: r In the first example, the probability using each access channel is the same in each mobile station, and the collision probability of packets in each access channel is 1/3. In the second example, each mobile station forms a group for each service class (type of contracted service), and the probability distribution of the mobile station is expressed when reporting the different probability distribution of every group. For each mobile station belonging to a group different from the groups to which the mobile stations shown in this embodiment belong, the probability of using the second and the third access channel is set low (to 0, for example). In this case, each mobile station belonging to the group shown in the second example can exclusively use the second and the third access channels. Therefore, if the number of the mobile stations belonging to the same group is suitable, each mobile station can receive services in which the collision probability of packets in the access channel is lower than that of mobile stations belonging to other groups.

In the third example, the probability distributions are changeable, that is, each value of p, q and r changes in accordance with various conditions. These probability distributions are used when realizing more efficient communication where there are different characteristics present, such as transmission speed, the carrier frequency present between the first, the second and the third access channel, etc. In this case, efficient communication is realized by dynamically changing the probability distribution in accordance with the quantity of traffic on each access channel, the condition of the electric waves, the function of each mobile station and so on.

This third embodiment adopts the first example, with traffic control portion 32 of base station 30 setting each probability distribution using each access channel 10A in mobile stations 1-4 to 1/3, 1/3 and 1/3, and outputting information expressing the probability distributions to base band signal processing portion 33. Base band signal processing portion 33 locates the information to the fixed bit position of broadcast channel 20, and outputs the information to transmission and receiving apparatus 31. As a result, each probability distribution is reported to mobile stations 1-4 through broadcast channel 20 respectively.

Next, an explanation will be made of the operation of the mobile communication system, with the focus on the difference from the first embodiment, with reference being made to FIG. 7. However, this example assumes that the probability distribution (1/3, 1/3, 1/3) for using each access channel 10A is reported from base station 30 to mobile stations 1-4 in advance.

In the state as described above, then, when mobile station 1 transmits transmission request signal PS1_R to base station 30 through the first access channel 10A, mobile station 2 transmits transmission request signal PS2_R to base station 30 through the second access channel 10A at the same time. The access channels used by both mobile stations are selected channels on the basis of the probability distribution which is reported from base station 30.

In message control portion 32 of base station 30, transmission request signals PS1_R and PS2_R are extracted, and are processed in the order in which they arrive. In FIG. 7, transmission request signal PS1_R and transmission request signal PS2_R are processed in that order. More concretely, at the point when transmission request signal PS1_R is extracted, traffic control portion 32 reads out the state of occurrence of traffic using any message channel 10B, and checks the state of utilization of all message channels 10B.

Figure 7:
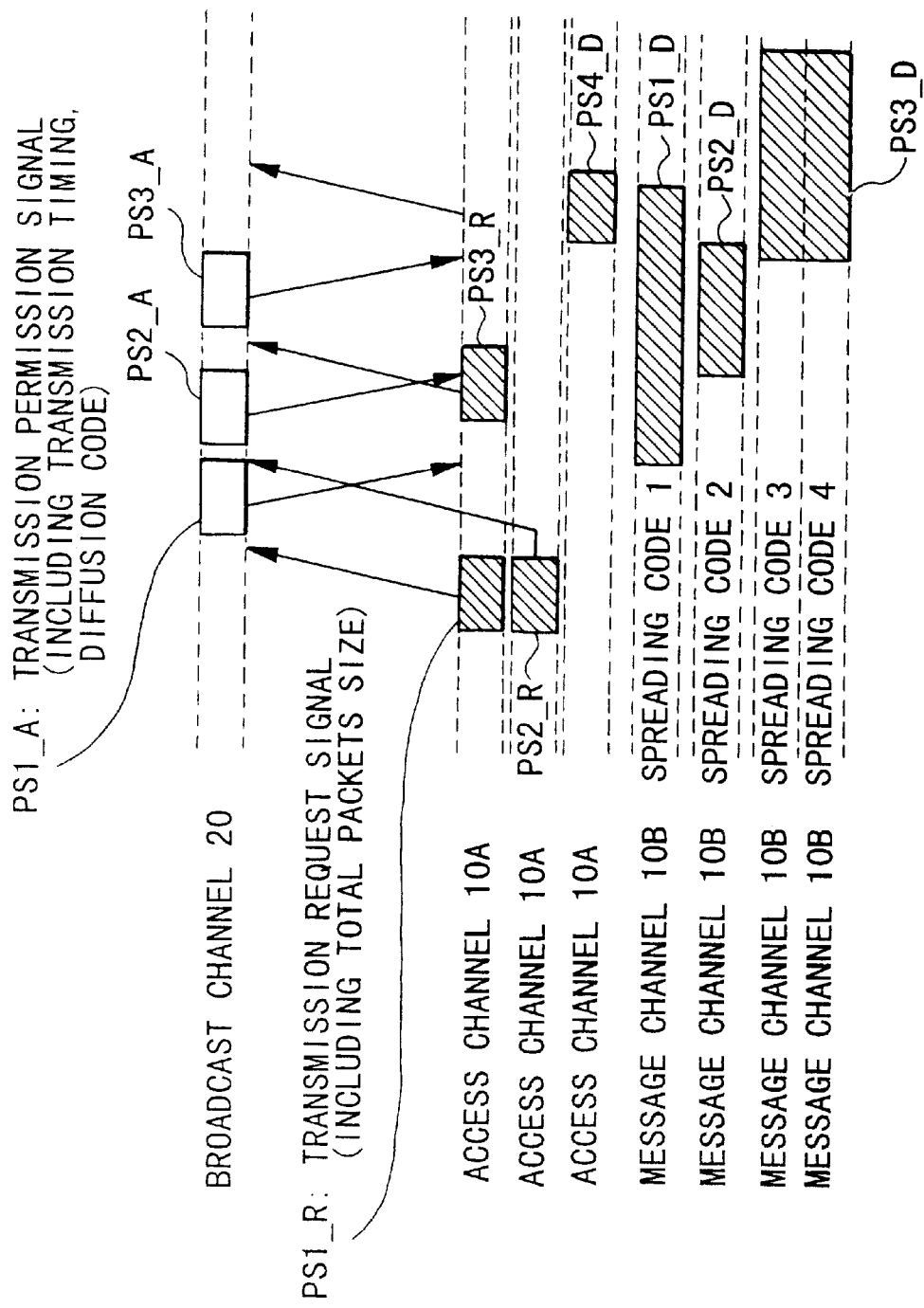
FIG. 7 is a timing chart showing the operation of a CDMA mobile communication system applying the multiple-access method of the third embodiment of the present invention.

In the example of FIG. 7, at the point when transmission request signal PS1_R is extracted, message channel 10B shown by spreading code 1 is not used, and there is no schedule to receive data through this message channel 10B. Further, there is no interference from other channels corresponding to other spreading codes, so that base station 30 immediately permits the transmission of data PS1_D. Next, traffic control portion 32 reads out the state of occurrence of traffic using any message channel 10B by answering transmission request signal PS2_R, and then checks the state of utilization of all message channels 10B. In FIG. 7, at the point when transmission request signal PS2_R is extracted, only the receipt of data PS1_D is scheduled, so that the traffic on message channel 10B is less. Therefore, base station 30 immediately permits the transmission of data PS2_D.

As a result, although transmission permission signals PS1_A, PS2_A are transmitted from base station 30 to mobile station 1-4, only one broadcast channel 20 exists, so that transmission permission signals PS1_A and PS2_A are transmitted in order. These transmission permission signals include information expressing the spreading code used in the data transmission and the transmission timing, as in the first embodiment.

The explanation of the operation for transmission data PS1_D, PS2_D is omitted here because this operation is the same as that of the first embodiment.

Next, mobile stations 3, 4 successively transmit transmission request signals PS3_R, PS4_R by using an access channel which is selected on the basis of the probability distribution reported from base station 30 respectively. The operation for these transmission request signals PS3_R, PS4_R is the same as that of the first embodiment, so that an explanation of the operation is omitted.

As is clear according to the aforementioned explanation, according to this third embodiment, there are a plurality of access channels 10A, so that the collision of packets does not occur if even a plurality of mobile stations transmit transmission request signals at the same time. Furthermore, provided that the probability distribution for each access channel 10A is set well, then still more efficient transmission is possible.

However, the above-mentioned third embodiment can be applied only in the case where a plurality of access channels can be set. Therefore, as in the first embodiment or the second embodiment, in the case where the system has only one access channel, it is impossible to obtain sufficient efficiency. That is, although many multiple-access methods which avoid packet collisions when there is only one common channel have been proposed until now, it has not been possible to obtain sufficient results with conventional systems.

Figure 8:
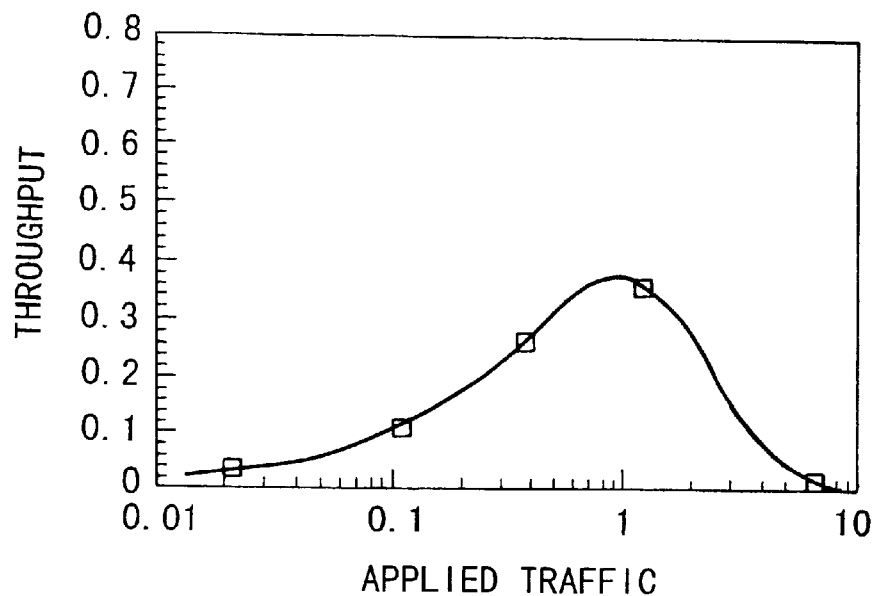
FIG. 8 is a graph diagram showing the relation between a throughput and the traffic applied (traffic to be operated) in which a Slotted ALOHA method is used.

An example of the Slotted ALOHA method, in which the mobile station immediately transmits packets to be transmitted, will now be considered. According to this method, as may be read out from FIG. 8, the throughput increases with the increase in traffic in a region where the traffic on the channel is slight. When there is considerable traffic on the channel, however, the transmission efficiency deteriorates because the collision frequency of packets becomes high. "Packets to be transmitted" as referred to here correspond to the transmission request signal in the first and the second embodiments. That is, if the Slotted ALOHA method is applied to the first and the second embodiments, the transmission efficiency deteriorate when the traffic on the common channel is considerable.

More concretely, according to the ICMA (Idle-signal Casting Multiple Access) method and ISMA (Idle Signal Multiple Access) methods, the base station reports an idling signal when the common channel is not used, and reports a busy signal when the common channel is used. The mobile station recognizes the condition of the common channel to receive a signal reported from the base station, and if the common channel is busy when packets to be transmitted occur, the mobile station is waiting until an idle state occurs, and then transmits the packets.

Using the ICMA method and ISMA method, it is possible to avoid the collision of packets in advance during the period when it is reported that the common channel is in use. Furthermore, if the mobile station does not transmit the packet immediately when the common channel becomes idle, but, rather, waits for a random period of time from when the common channel becomes idle before transmitting the packet, or if the mobile station presets a probability for transmitting immediately at the point where the common channel becomes idle state, it then becomes possible to decrease the probability of a packet collision immediately after the reported signal changes from a busy signal to an idle signal.

However, in the ICMA method and ISMA method, the base station changes the reported signal from an idle signal to a busy signal by detecting the first slot of the packet signal transmitted from the mobile station, so that a delay occurs for the time from which the common channel is actually in use until the busy signal is reported. During this delay time, it is impossible to avoid the collision of packets. In particular, when the packet size transmitted from the mobile station is small, the ratio of the delay time for a transmission time of the packet signal becomes large, so that it is impossible to avoid a packet collision effectively.

In generally, the mobile station transmits only the minimum signal to attempt an effective use of the channel. Thus, there are a large number of cases in which packets having a comparatively small size are transmitted. In particular, in the case where it is possible to transmit packets with one slot, there is hardly any decrease in the possibility of a packet collision. As a result, the transmission efficiency is equivalent to that of the Slotted ALOHA method.

Figure 9:
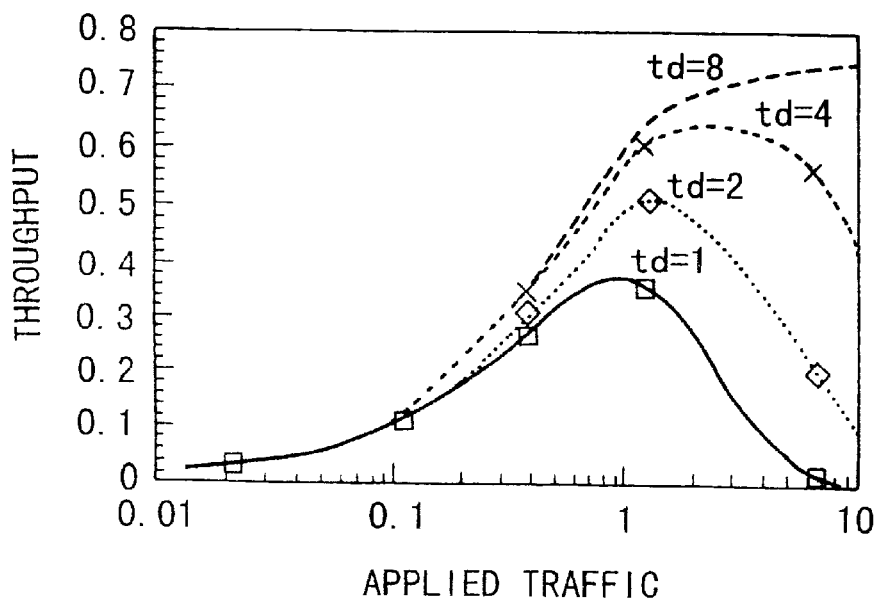
FIG. 9 is a graph diagram showing the relation between a throughput and the traffic applied in which ICMA-PE, one method of ICMA, is used.

The above-mentioned state is expressed in FIG. 9 which shows the relation between applied traffic and a throughput in a ICMA-PE (ICMA with Partial Echo). In FIG. 9, td indicates the number of the slot which is composed of one packet. In the case where the packet size is large, that is, in case where td is large, the throughput is high. But, as is clear from FIG. 9, in the case where td=1, that is, in the case where packets are transmitted with one slot, the throughput is equivalent to the transmission efficiency in the Slotted ALOHA method.

Next, an explanation will be made of the forth and the fifth embodiments in which the throughput does not decrease even if the applied traffic increases or the packet size becomes small. However, in the forth and the fifth embodiments, "reverse channel", which is the common channel, corresponds to the reverse channel in the first, the second and the third embodiments. However, the reverse channel is a single channel only, and is not divided into an access channel and a message channel. It is of course possible to apply the forth and the fifth embodiments to a packet communication in which packets are transmitted through the access channel obtained by dividing the reverse channel, with even greater efficiency obtained in this case.

D. Fourth Embodiment

An explanation will now be made of the structure of a CDMA mobile communication system applying the multiple-access method of the fourth embodiment with reference being made to FIG. 10. However, in FIG. 10, the same numbers are applied to parts identical to those in FIG. 1, with an explanation thereof omitted. But, in FIG. 10, there is only one reverse channel 10 which is used without being divided. Furthermore, control portion 52 of each mobile station 1-4 is different from that of the first and the second embodiments. That is, control portion 52 consists of a storing means, such as a memory or the like, which records the transmission probability, a function for renewing the transmission probability memorized in the storing means, and a function for carrying out the transmission process in accordance with the renewed transmission probability. When there is an occurrence of information to be transmitted, then the transmission probability has a value which corresponds to the average waiting time until the transmission of the information is initiated. Immediately after the occurrence of information to be transmitted, then the transmission probability means the probability of transmitting the information immediately.

Figure 10:
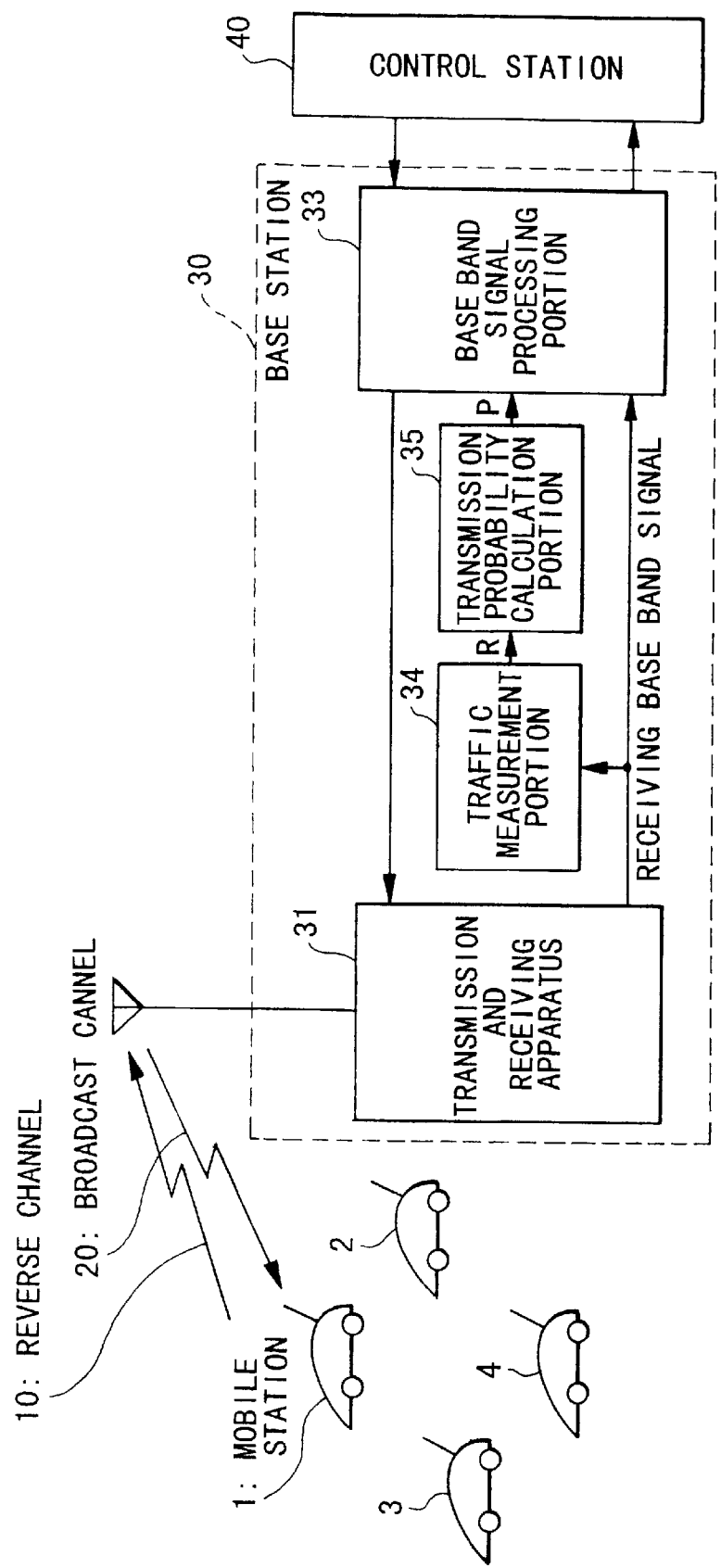
FIG. 10 is a block diagram showing a structural example of a CDMA mobile communication system applying the multiple-access method according to the forth embodiment of the present invention.

The structure shown in FIG. 10 is different from that shown in FIG. 1 in that the base station consists of a traffic measurement portion 34 and a transmission probability calculation portion 35, instead of traffic control portion 32. Transmission and receiving apparatus 31 outputs the receiving base band signal to base band signal processing portion 33 and traffic measurement portion 34. Traffic measurement portion 34 measures the effective receiving packet number within a unit time, or the interference electrical power, in the receiving base band signal supplied, and outputs traffic information R showing the measurement result to transmission probability calculation portion 35.

Transmission probability calculation portion 35 calculates a transmission probability P which corresponds to the traffic information R (effective receiving packet number) outputted from traffic measurement portion 34, by using the table shown in FIG. 11, and outputs transmission probability P to base band signal processing portion 33. The table, for example, is stored in memory which is provided in transmission probability calculation portion 35.

In the table, $Th1<Th2<Th3<Th4$, and $1.0>=P1>P2>P3>P4>P5>0.0$. The table prescribes that when traffic information R (effective receiving packet number) is at the smallest value and $R<Th1$, then the transmission probability P (P1) is set to 1.0, with the probability becoming smaller as traffic information R becomes larger.

Furthermore, base band signal processing portion 33 locates transmission probability P outputted from transmission probability calculating portion 35 at a fixed bit position of transmission base band signal, and then outputs the transmission probability to transmission and receiving apparatus 31. However, traffic control portion 34 and transmission probability calculating portion 35 are operated in synchronization at fixed intervals, so that transmission probability P is also transmitted to mobile stations 1-4 through broadcast channel 20 at a fixed interval.

Next, an explanation will be made of the operation of this system from the perspective of the mobile station side. Herein, it is assumed that each mobile station 1-4 respectively records a waiting time T which is determined in advance in the storing means in control portion 52.

Mobile stations 1-4 are normally in an idling state (state S10). When mobile stations 1-4 receive a signal including transmission probability P informed through broadcast channel 20, mobile stations 1-4 abandon the transmission probability recorded in advance, and newly record the transmission probability P including the received signal (state S20), and return to the idling state (state S10).

When a packet of information to be transmitted is generated, mobile stations 1-4 generate a random number RND occurring uniformly within the range from zero or greater to 1 or less (state S30), and compare the size of the generated random number RND and the transmission probability P (state S40). In state S40, when RND<P, mobile stations 1-4 transmit information to be transmitted (state S50), and then return to the idling state. As a result, information to be transmitted is transmitted at a timing which is based on transmission probability P.

In contrast, when RND>=P, mobile stations 1-4 do not transmit the information to be transmitted, but wait for a waiting time T (state S60). Mobile stations 1-4 then generate a uniform random number RND again (state S30), after waiting. Thereafter, the aforementioned process is carried out repeatedly, until finally, the relationship between random number RND and the transmission probability P becomes RND<P in state S40. Then, mobile stations 1-4 transmit the information to be transmitted (state S50). However, in the case where mobile stations 1-4 receive a new transmission probability P while waiting for the waiting time T, then the mobile stations 1-4 renew transmission probability P in the same way as the renewal process in the idling state (state S70).

Furthermore, in general, the transmission process of packets in state S50 is finished after mobile stations 1-4 receive a receiving acknowledgment signal (ACK) from the base station. When mobile stations 1-4 do not receive an ACK signal from the base station, they then transmit the packets again. Of course, when mobile stations 1-4 receive a transmission probability P during the retransmission process, the transmission probability P is renewed (state S80).

Although waiting time T is a fixed value in this embodiment, it may also be made to change randomly. More concretely, for example, a maximum waiting time Tmax is stored in advance in the storing means of control portion 52 in each mobile station 1-4. In state S60, first, mobile stations 1-4 generate an uniform random number RND below, and decide waiting tine T based on T=Tmax×RND. As described, it is possible to reduce the probability of repeated collisions, by randomly changing the waiting time.

Furthermore, it is possible to change waiting time T in accordance with a predetermined rule. More concretely, for example, a list of the waiting times T(1), T(2), ... T(N) is recorded in advance in the storing means of control portion 52 in each mobile station 1-4. During the first period of waiting, mobile stations 1-4 wait for a waiting time T(1). In the nth waiting period (n<N), mobile station 1-4 wait for waiting time T(n). Beyond the Nth waiting period, mobile stations 1-4 wait for waiting time T(N). Furthermore, it is permissible to prerecord only the waiting time of the first waiting period in the storing means, with the waiting period of the nth time (1<n) being made half of the waiting period of the n-1th time. Furthermore, for example, the maximum waiting time Tmax may be changed regularly, while also randomly changing the waiting time T within the maximum waiting time Tmax.

Although there are various procedures to change the waiting time, basically, it is possible to decrease the break-up of the delay time for each information by shortening the waiting time and increasing the number of times of the retransmission.

In addition, it is possible to also change transmission probability P by the aforementioned procedures. For example, a list of transmission probability P(1), P(2), ... P(N) is made and recorded in the storing means of control portion 52 in each mobile station 1-4 in advance. The first time, mobile stations 1-4 transmit with transmission probability P(1), while at the nth time, mobile stations 1-4 transmit with transmission probability P(n). Furthermore, it is possible to apply a method in which a rule for changing the transmission probability P is recorded in advance. For example, it is possible to obtain transmission probability P(n) for the nth time according to the formula P(n)=(1+P(n−1))/2 by recording only transmission probability P(1) for the first time in advance.

Although there are various procedures to change the transmission probability, basically, it is possible to decrease a break-up of delay time for each information by making the transmission probability be large while increasing the number of times of the retransmission.

E. Fifth Embodiment

Figure 13:
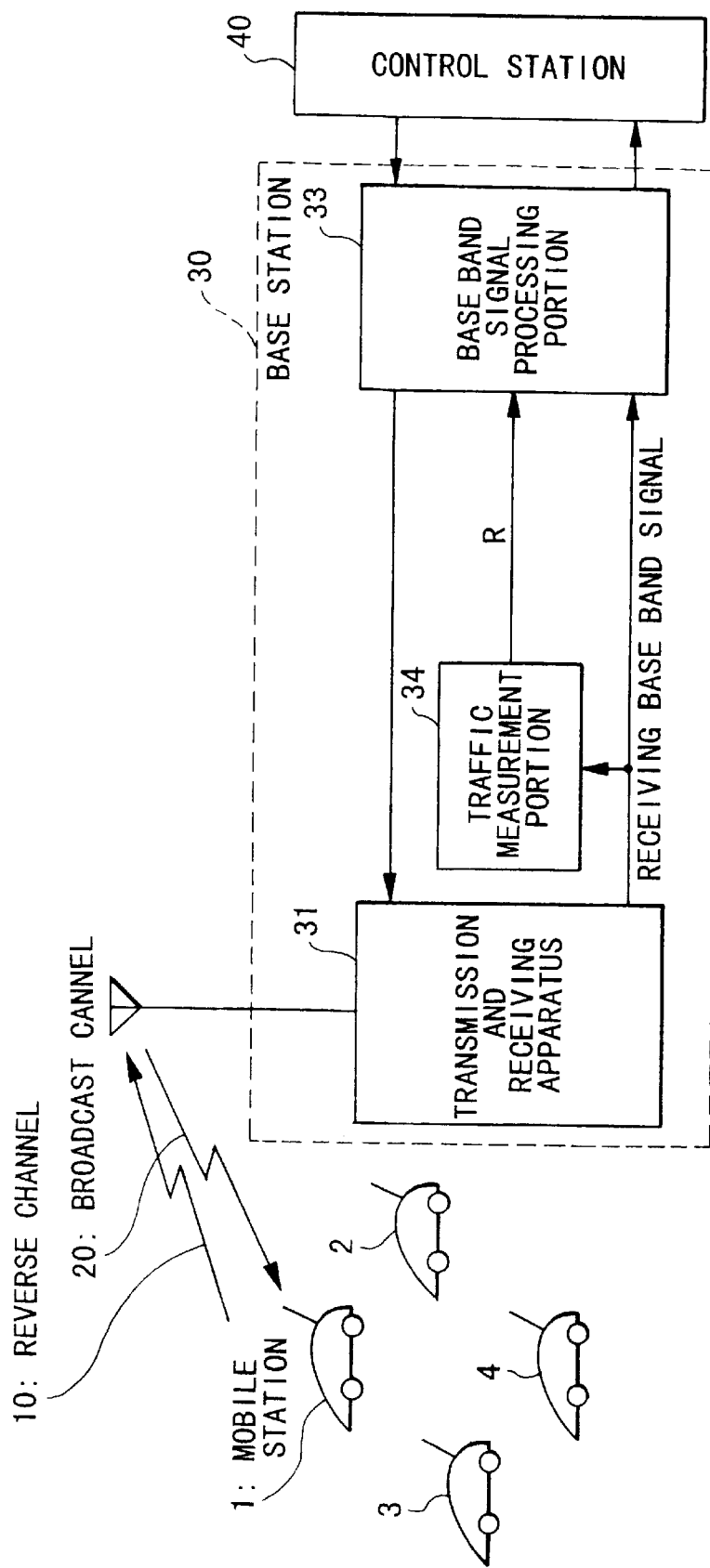
FIG. 13 is a block diagram showing a structural example of a CDMA mobile communication system applying the multiple-access method by the fifth embodiment of the present invention.

An explanation will now be made of the structure of a CDMA mobile communication system applying the multiple-access method of the fifth embodiment, with reference being made to FIG. 13. However, in FIG. 13, the same number is applied to portions identical to those in FIG. 1, with an explanation thereof omitted. The structure shown in FIG. 13 differs from that shown in FIG. 13 in that the information reported from base station 30 to each mobile station 1-4 is not transmission probability P, but traffic information R, with each mobile station 1-4 deciding transmission probability P based on traffic information R reported from base station 30.

Figure 12:
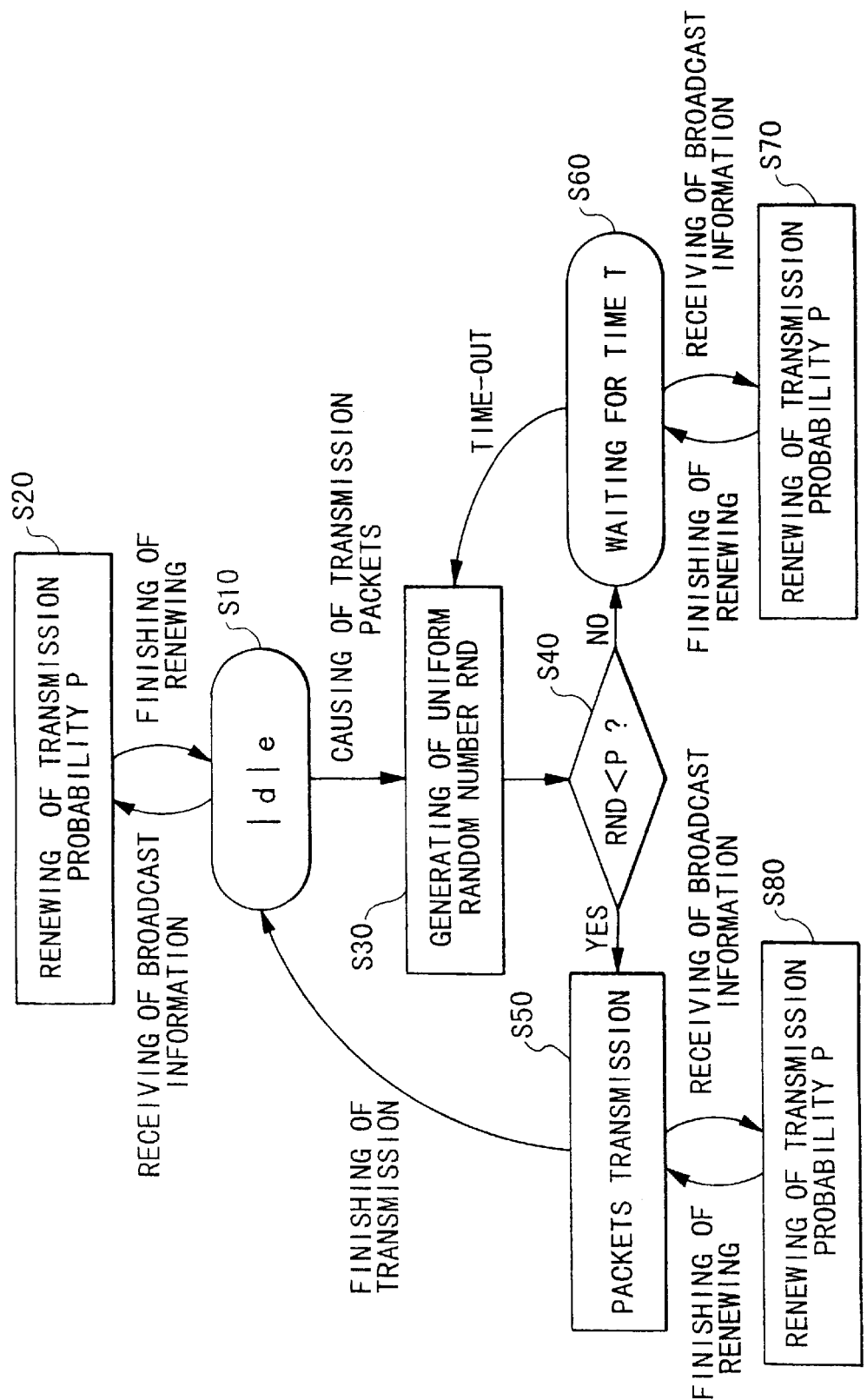
FIG. 12 is a conceptual diagram showing the transition of conditions of a mobile station in a CDMA mobile communication system shown in FIG. 10.

Therefore, base station 30 does not consist of transmission probability calculation portion 35, and is constructed to output traffic information R directly from traffic measurement portion 34 to base band signal processing portion 33. Furthermore, base band signal processing portion 33 arranges traffic information R outputted from traffic measurement portion 34 to a fixed bit position of transmission base band signal, and then outputs to transmission and receiving apparatus 31. On the other hand, control portion 52 of each mobile station 1-4 records the same table as that shown in FIG. 11 in advance, and extracts traffic information R from a reported signal. Furthermore, control portion 52 obtains transmission probability P from the traffic information R by using the table, and renews transmission probability P recorded in advance. That is, this fifth embodiment differs from the fourth embodiment in that each mobile station 1-4 independently obtains transmission probability P and not by base station 30. Therefore, when the operation of this system is considered from the perspective of the mobile station, procedures are added to obtain transmission probability P by using the table in states S20, S70 and S80 shown in FIG. 12. These procedures are the only differences of this embodiment from that of the fourth embodiment.

According to the fifth embodiment, it is possible to change the transmission probability of each mobile station. As a result, it is possible to add priority for accessing to each mobile station. Furthermore, even in the event that a new algorithm for deciding a transmission probability were developed, it is possible to apply the new algorithm to newly manufactured mobile station only, without changing the structure of the base station. Therefore, it is possible to change the traffic control method of the whole system without impairing the reliability of communications of the existing mobile station. As is clear from the above-mentioned explanation, by carrying out control to increase the transmission probability when traffic is less, or carrying out control to decrease the transmission probability when traffic is considerable, it is possible to maintain a high throughput and to decrease the probability that the collision of packets will occur. As a result, it is possible to prevent a deterioration of the throughput when the applied traffic increases.

Moreover, the method of the forth and fifth embodiments, and the method of the first through third embodiments, may be combined optionally. In particular, in the first through third embodiments, the packet size on the access channel is small necessarily, so that by applying the method of the forth and fifth embodiments, it is possible to promote transmission efficiency of the packet remarkably as compared with the conventional method.

This invention may be practiced or embodied in still other ways without departing from the sprit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. A multiple-access method for communication between a base station and a plurality of mobile stations, said method comprising the steps of:

(a) establishing a common channel for transmitting data from said mobile stations to said base station, said common channel being defined with at least one access channel and at least one message channel;

(b) establishing a broadcast channel for transmitting data from said base station to said mobile stations;

(c) transmitting message data, if smaller than a certain size, from a mobile station to said base station through said access channel;

(d) requesting transmission of message data, if larger than said certain size, from a mobile station to said base station through said access channel, said request including information regarding the size of said larger message data to be transmitted;

(e) determining at said base station in response to said request a timing to transmit said larger message data, based on the size of said larger message data and a traffic condition on said message channel;

(f) advising said mobile station of said determined timing through said broadcast channel; and (g) transmitting said larger message data at said determined timing from said mobile station to said base station through said message channel.

2. A multiple-access method according to claim 1, wherein said common channel is defined with a plurality of said message channels.

3. A multiple-access method according to claim 2, wherein a different spread code is assigned to each of said message channels, at least one of said spread codes being allotted to each of said mobile stations, said base station selects at least one spread code from those allotted to said mobile station and advises said mobile station of said selected spread code in addition to said determined timing to transmit said larger message data, and said mobile station transmits said larger message data at said determined timing, using said selected spread code.

4. A multiple-access method according to claim 3, wherein said mobile station, upon requesting transmission of said larger message data, advises said base station, through said access channel, of the spread codes allotted thereto.

5. A multiple-access method according to claim 1, wherein said common channel is defined with a plurality of said access channels.

6. A multiple-access method according to claim 5, wherein at least one of said access channels is allotted to each of said mobile stations, and said mobile station requests, through said access channel allotted thereto, transmission of said larger message data.

7. A multiple-access method according to claim 5, wherein each of said mobile stations is assigned a different distribution of probabilities that a data collision will occur on said access channels, and said mobile station selects one of said access channels according to said probability distribution assigned thereto.

8. A multiple-access method according to claim 5, wherein said base station advises each of said mobile stations, through said broadcast channel, of said probability distribution assigned thereto.

9. A multiple-access method according to claim 1, further comprising the steps of:

(h) detecting a traffic condition on said access channel;

(i) determining, based on said detected traffic condition, a probability that one mobile station can transmit data through said access channel without a collision with other data from another mobile station;

(j) generating a random number at each of mobile stations that have data to be transmitted through said access channel;

(k) separating said mobile stations that have data to be transmitted into a first group and a second group according to whether their random numbers are larger or smaller than said probability;

(l) halting the mobile stations in said first group for a certain period of time and then moving back to said step (j); and (m) allowing the mobile stations in said second group to transmit, through said access channel, either said smaller message data or said request to transmit said larger message data.

10. A multiple-access method according to claim 9, wherein said base station performs said steps (h) and (i) and notifies said mobile stations of said probability.

11. A multiple-access method according to claim 9, wherein said base station performs said step (h) and notifies said mobile stations of said detected traffic condition on said access channel, and said mobile stations perform said step (i).

12. A multiple-access method according to claim 10, wherein in said step (l), said steps (h) and (i) are executed.

13. A multiple-access method according to claim 11, wherein in said step (l), said steps (h) and (i) are executed.

14. A multiple-access method according to claim 10, wherein in said step (m), said steps (h) and (i) are executed.

15. A multiple-access method according to claim 10, wherein in said step (m), said steps (h) and (i) are executed.

16. A multiple-access method according to claim 9, each of said mobile stations can individually change said certain period of time for which it is to be halted.

17. A multiple-access method according to claim 16, wherein each of said mobile stations changes said certain period of time at random.

18. A multiple-access method according to claim 16, wherein each of said mobile stations changes said certain period of time on the basis of a number of times it has been halted.

19. A multiple-access method according to claim 9, wherein each of said mobile stations can individually adjust said probability on the basis of a number of times it has been halted.

20. A base station communicating with a plurality of mobile stations, said base station comprising:
(a) a receiver (31) for establishing a common channel with said mobile stations to receive data therefrom, said common channel being defined with at least one access channel and at least one message channel,
said access channel being used to receive message data of a size smaller than a certain value and a request for transmitting message data of a size larger than said certain value, said request including information regarding the size of said larger message data to be received, and
said message channel being used to receive said larger message data;
(b) A traffic controller (32) for determining in response to said request a timing to transmit said larger message data, based on the size of said larger message and a traffic condition on said message channel; and
(c) a transmitter (31) for establishing a broadcast channel with said mobile stations to advise said mobile station of said determined timing.

21. A base station according to claim 20, wherein said common channel is defined with a plurality of said message channels.

22. A base station according to claim 21, wherein
a different spread code is assigned to each of said message channels, at least one of said spread codes being allotted to each of said mobile stations,
said traffic controller selects at least one spread code among those allotted to said mobile station, and
said transmitter advises said mobile station, through broadcast channel, of said selected spread code in addition to said determined timing to transmit said larger message data.

23. A base station according to claim 20, wherein said common channel is defined with a plurality of said access channels.

24. A base station according to claim 23, wherein said traffic controller assigns each of said mobile stations a different distribution of probabilities that a data collision will occur on said access channels, and said transmitter advises each of said mobile stations, through said broadcast channel, of said probability distribution assigned thereto.

25. A mobile station communicating with a base station, said mobile station comprising:
(a) a receiver (51) for establishing a broadcast channel with said base station to receive a timing to transmit message data of a size larger than a certain value; and
(b) a transmitter (51) for establishing a common channel with said base station to transmit data thereto, said common channel being defined with at least one access channel and at least one message channel,
said access channel being used to transmit message data of a size smaller than said certain value and a request for transmitting said larger message data, said request including information regarding the size of said larger message data to be transmitted, and
said message channel being used to transmit said larger message data at said timing received from said base station.

26. A mobile station according to claim 25, wherein said common channel is defined with a plurality of said message channels.

27. A mobile station according to claim 26, wherein
a different spread code is assigned to each of said message channels, at least one of said spread codes being allotted to said mobile station,
said request includes information regarding the spread codes allotted to said mobile station, and
said transmitter transmits said larger message data at said timing received from said base station, using at least one spread code selected by said base station from said spread codes allotted to said mobile station.

28. A mobile station according to claim 25, wherein said common channel is defined with a plurality of said access channels.

29. A mobile station according to claim 28, wherein at least one of said access channels is allotted to said mobile station, and said transmitter transmits, through said access channel allotted to said mobile station, said request for transmitting said larger message data.

30. A mobile station according to claim 28, wherein said mobile station is assigned a different distribution of probabilities that a data collision will occur on said access channels, and said mobile station further comprises a control portion (51) that selects one of said access channels according to said probability distribution assigned thereto.

31. A multiple-access method for a CDMA mobile communication system having a common channel through which a plurality of mobile stations transmit data to a base station and a broadcast channel through which said base station transmits data to said mobile stations, said common channel being defined with at least one access channel and at least one message channel, said multiple-access method comprising the steps of:
(a) detecting a traffic condition on said access channel;
(b) determining, based on said detected traffic condition, a probability that one mobile station can transmit data through said access channel without a collision with other data from another mobile station;
(c) generating a random number at each of mobile stations that have message data to be transmitted through said message channel;
(d) separating said mobile stations that have said message data to be transmitted into a first group and a second group according to whether their random numbers are larger or smaller than said probability;
(e) halting the mobile stations in said first group for a certain period of time and then moving back to said step (c);
(f) allowing the mobile stations in said second group to transmit, through said access channel, a request to transmit said message data;
(g) determining at said base station timings for the mobile stations in said second group to transmit their message data;
(h) advising the mobile stations in said second group of the determined timings through said broadcast channel; and (i) transmitting said message data at said determined timings from the mobile stations in said second group to said base station through said message channel.

32. A multiple-access method according to claim 31, wherein said common channel is defined with a plurality of said message channels.

33. A multiple-access method according to claim 32, wherein
  a different spread code is assigned to each of said message channels, at least one of said spread codes being allotted to each of said mobile stations,
  said base station selects at least one spread code from those allotted to the mobile station and advises said mobile station of said selected spread code in addition to said determined timing to transmit said message data, and
  said mobile station transmits said message data at said determined timing, using said selected spread code.

34. A multiple-access method according to claim 33, wherein said mobile station, upon requesting transmission of said message data, advises said base station through said access channel of the spread codes allotted thereto.

35. A multiple-access method according to claim 31, wherein said base station performs said steps (a) and (b) and notifies said mobile stations of said probability.

36. A multiple-access method according to claim 31, wherein said base station performs said step (a) and notifies said mobile stations of said detected traffic condition on said communication channel, and said mobile stations perform said step (b).

37. A multiple-access method according to claim 35 wherein in said step (e), said steps (a) and (b) are executed.

38. A multiple-access method according to claim 36, wherein in said step (e), said steps (a) and (b) are executed.

39. A multiple-access method according to claim 35, wherein in said step (f), said step (a) and (b) are executed.

40. A multiple-access method according to claim 36, wherein in said step (f), said steps (a) and (b) are executed.

41. A multiple-access method according to claim 31, each of said mobile stations can individually change said certain period of time for which it is to be halted.

42. A multiple-access method according to claim 41, wherein each of said mobile stations changes said certain period of time at random.

43. A multiple-access method according to claim 42, wherein each of said mobile stations changes said certain period of time on the basis of a number of times it has been halted.

44. A multiple-access method according to claim 31, wherein each of said mobile stations can individually adjust said probability on the basis of a number of times it has been halted.

45. A multiple-access method for controlling communication among a plurality of stations sharing at least one communication channel, said method comprising the steps of:
  (a) detecting a traffic condition on said communication channel;
  (b) determining, based on said detected traffic condition, a probability that one station can transmit data through said communication channel without a collision with other data from another station;
  (c) generating a random number at each of stations that have data to be transmitted through said communication channel;
  (d) separating said stations that have data to be transmitted into a first group and a second group according to whether their random numbers are larger or smaller than said probability;
  (e) halting the stations in said first group for a certain period of time and then moving back to said step (c); and
  (f) allowing the stations in said second group to transmit the data through said communication channel.

46. A multiple-access method according to claim 45, wherein in said step (e), said steps (a) and (b) are executed.

47. A multiple-access method according to claim 45, wherein in said step (f), said step (a) and (b) are executed.

48. A multiple-access method according to claim 45, each of said stations can individually change said certain period of time for which it is to be halted.

49. A multiple-access method according to claim 48, wherein each of said stations changes said certain period of time at random.

50. A multiple-access method according to claim 48, wherein each of said stations changes said certain period of time on the basis of a number of times it has been halted.

51. A multiple-access method according to claim 45, wherein each of said stations can individually adjust said probability on the basis of a number of times it has been halted.

* * * * *

UNITED STATES PATENT AND TRADEMARK OFFICE
CERTIFICATE OF CORRECTION

PATENT NO. : 6,078,572
DATED : June 20, 2000
INVENTOR(S) : Motohiro Tanno et al.

It is certified that error appears in the above-identified patent and that said Letters Patent is hereby corrected as shown below:

Title page,
U.S. PATENT DOCUMENTS,
Before line 1, insert the following:
-- 4,841,527   6/1989   Raychaudhuri et al. --.

FOREIGN PATENT DOCUMENTS,
After line 5, insert the following:
-- 0 475 698   3/1992   Europe. --.
After line 8, insert the following:
-- 2 270 815   3/1994   Great Britain. --.

Claim 15,
Line 1, delete "claim 10" and substitute -- claim 11 -- in its place.

Signed and Sealed this

Eighteenth Day of December, 2001

Attest:

Attesting Officer

JAMES E. ROGAN
Director of the United States Patent and Trademark Office